United States Patent [19]
Noe et al.

[11] Patent Number: 6,039,372
[45] Date of Patent: Mar. 21, 2000

[54] GRILL LIFTING TOOL

[76] Inventors: Reginald J. Noe; Toni S. Stroud, both of 611 S. Carbon, Girard, Kans. 66743

[21] Appl. No.: 09/204,665

[22] Filed: Dec. 2, 1998

[51] Int. Cl.[7] ...................................................... A47J 45/10
[52] U.S. Cl. .................................. 294/10; 294/2; 294/27.1
[58] Field of Search ............................. 294/2, 6, 7, 9–14, 294/15, 19.1, 23.5, 24, 26, 27.1, 92; 7/109, 110, 167; 15/105, 111, 236.01, 236.08; D7/601, 669, 688

[56] References Cited

U.S. PATENT DOCUMENTS

| | | | |
|---|---|---|---|
| 163,659 | 5/1875 | Hoyt | 294/10 X |
| 269,767 | 12/1882 | Wilson | 294/2 |
| D. 312,375 | 11/1990 | Hessler . | |
| D. 345,285 | 3/1994 | Hull et al. . | |
| 378,449 | 2/1888 | Kendall | 294/12 X |
| 910,810 | 1/1909 | Hall | 294/10 |
| 2,571,943 | 10/1951 | Ray et al. | 294/2 X |
| 3,434,175 | 3/1969 | Bray | 294/7 X |
| 4,247,140 | 1/1981 | Gordon . | |
| 4,471,985 | 9/1984 | Mahoney . | |
| 4,482,181 | 11/1984 | Shepherd . | |
| 4,801,166 | 1/1989 | Jordan et al. . | |
| 4,823,419 | 4/1989 | Stimpson . | |
| 5,729,854 | 3/1998 | Powers . | |

*Primary Examiner*—Johnny D. Cherry
*Attorney, Agent, or Firm*—Chase & Yakimo, L.C.

[57] ABSTRACT

A grill lifting tool comprises an elongated handle with a head attached to a distal end thereof relative to a user. The head presents a first slot adapted to receive at least two bars of a grate therein, and a second slot in communication with the first slot for capturing one of the grate bars within the first slot upon a lifting of the proximal end of the handle by a user. A third slot is presented in the bottom side of the head for capturing another grate bar upon lifting of the handle by a user. The head further includes a hook pivotally attached to a side of the head for releasably coupling the tool to the bar of the grate that is aligned with the second slot. The head of the lifting tool is also configured as a scraper and includes a brush for cleaning the bars of the grate.

20 Claims, 6 Drawing Sheets

GRILL LIFTING TOOL

BACKGROUND OF THE INVENTION

This invention relates to a tool for lifting the grate of a barbecue grill and, more particularly, to a lifting tool which captures selected bars of the grate for safer and more secure lifting of the grate.

Various devices have been proposed in the prior art for lifting, carrying, or cleaning the grate of a barbecue grill. Although assumably effective in operation, such devices are not adapted to tightly secure the grate to the lifting device so as to minimize the risk of the grate being dislodged from the tool during lifting or transport. This disadvantage is particularly dangerous when a user is attempting to lift or move a heavy or hot grate.

It is therefore desirable to have a grill lifting tool which can receive multiple bars of a grate for enhanced leverage when lifting or transporting the grate. It is further desirable to have a lifting tool which can be coupled to a grate to prevent the grate from falling during lifting or transport. It is also desirable to have an improved lifting tool which can be used to clean the bars of the grate.

SUMMARY OF THE INVENTION

In response thereto, we have invented a grill lifting tool having an elongated handle with a head integrally attached to the distal end thereof relative to a user. The head presents a first slot which can receive at least two bars of the grate of a barbecue grill, the first slot presenting upper and lower surfaces which surround the bars received therein. The head further includes a second slot defined by the upper surface of the first slot and in communication therewith for capturing the most interiorly disposed grate bar in the first slot upon a user lifting the proximal end of the handle.

The grill lifting tool also includes a hook pivotally attached to one side of the head. The hook can be pivoted toward the distal end of the handle relative to a user so as to hold a grate bar within the first slot, thereby coupling the lifting tool to the grate. The head further includes a third slot presented in the lower surface of the head and configured to receive a bar of the grate. The third slot inhibits sliding of the grate bars in the first slot and captures a grate bar therein upon a user lifting the proximal end of the handle. The lifting tool further includes a scraper and a brush for cleaning the bars of a grill.

It is therefore a general object of this invention to provide a lifting tool which can safely lift the grate of a grill.

Another object of this invention is to provide a lifting tool, as aforesaid, which can receive at least two bars of the grill for providing more secure leverage while lifting or moving the grate.

Still another object of this invention is to provide a lifting tool, as aforesaid, which can capture at least one grate bar upon lifting the proximal end of the tool handle.

Yet another object of this invention is to provide a lifting tool, as aforesaid, which can be coupled to a grate for preventing unintended dropping or swinging of the grate during lifting or transport thereof.

A further object of this invention is to provide a lifting tool, as aforesaid, having a brush for cleaning bars of a grate.

A still further object of this invention is to provide a lifting tool, as aforesaid, having a scraper for cleaning the bars of a grate.

Another object of this invention is to provide a lifting tool, as aforesaid, which includes a plurality of slots disposed in the head at selected locations to provide the above objects.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
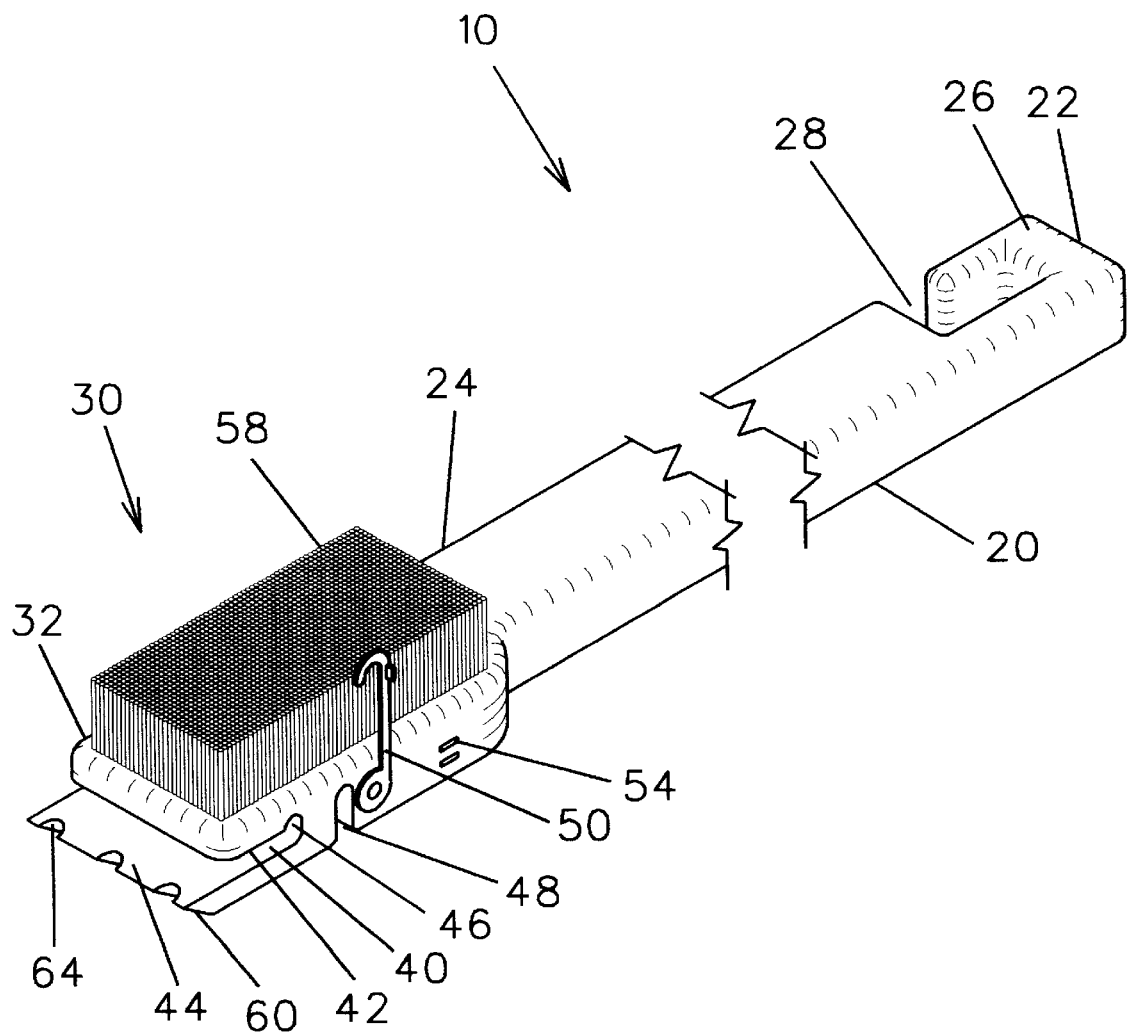
FIG. 1 is a perspective view of the grill lifting tool, the handle being foreshortened for purposes of illustration.

Turning more particularly to the drawings, FIG. 1 shows the now preferred embodiment of the grill lifting tool 10 comprising an elongated handle 20 having proximal 22 and distal 24 ends relative to a user. The proximal end 22 of the handle 20 forms a generally U-shaped hook member 26 presenting an opening 28 in one side of the handle 20 for hangably storing the tool 10 when not in use.

Figure 2:
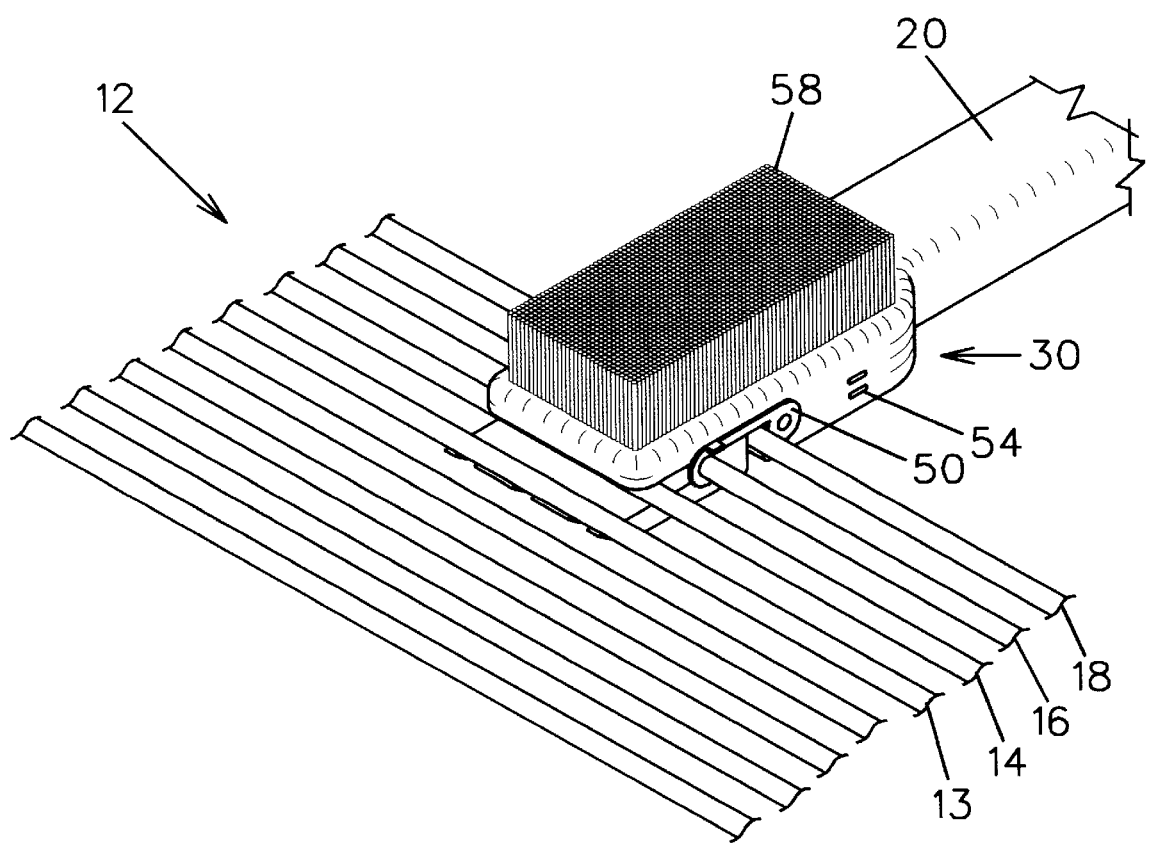
FIG. 2 is a perspective view of the head of the lifting tool of FIG. 1 coupled to the bars of a grate.

The lifting tool 10 further includes a head 30 integrally attached to the distal end 24 of the handle 20, the head presenting upper 32 and lower 34 surfaces with side walls 36 extending therebetween. The distal end 24 of the head 30 presents a first slot 40 extending interiorly into the head 30. The first slot 40 is bounded by upper 42 and lower 44 parallel surfaces configured to receive at least two spaced apart bars of a grate 12. The upper surface 42 of the first slot 40 defines a second vertical slot 46 which extends the width of the head 30 and is in communication with the first slot 40. The second slot 46 is preferably positioned at the interior end of the first slot 40 and is normal thereto. The second slot 46 presents an annular configuration suitable for capturing the innermost grate bar 16 within the first slot 40 that is aligned with the second slot 46 upon a user lifting of the proximal end 22 of the handle 20 (FIG. 2). The upper surfaces 32, 42 of the head 30 and first slot 40 are shorter than the lower surfaces 34, 44 of the head 30 and first slot 40 so as to enable the lifting tool 10 to be oriented between the bars of a grate 12 for lifting as further described later (FIG. 2).

The lower surface 34 of the head 30 presents a third slot 48 normal thereto and extending the width of the head 30. The third slot 48 is bounded by opposed side walls forming an annular configuration for receiving a bar 18 of a grate 12. The third slot 48 is displaced from the first 40 and second 46 slots so as to receive the grate bar 18 adjacent to the two grate bars 14, 16 received in the first 40 and second 46 slots, as shown in FIG. 2.

An elongated hook 50 is pivotally mounted to a side wall 36 of the head 30, the hook having a U-shaped free end 52 for capturing a bar of the grate 12 positioned within first slot 40. Upon pivotal movement by a user toward the proximal end 22 of the handle 20, the hook 50 can be snappably secured in a storage position between a pair of flanges 54 attached to the side wall 36 of the head 30 (FIGS. 4 and 5).

A tab/flange 56 is fixedly attached adjacent the free end 52 of the hook 50 such that a user can release the hook 50 from flanges 54. The hook 50 can be rotated about its pivot axis such that the free end 52 thereof registers with the second slot 46 for capturing a grate bar 16 aligned therewith (FIG. 2). Thus, the tool 10 can be coupled to the grate 12 to prevent the grate from falling or sliding during lifting thereof.

Figure 3:
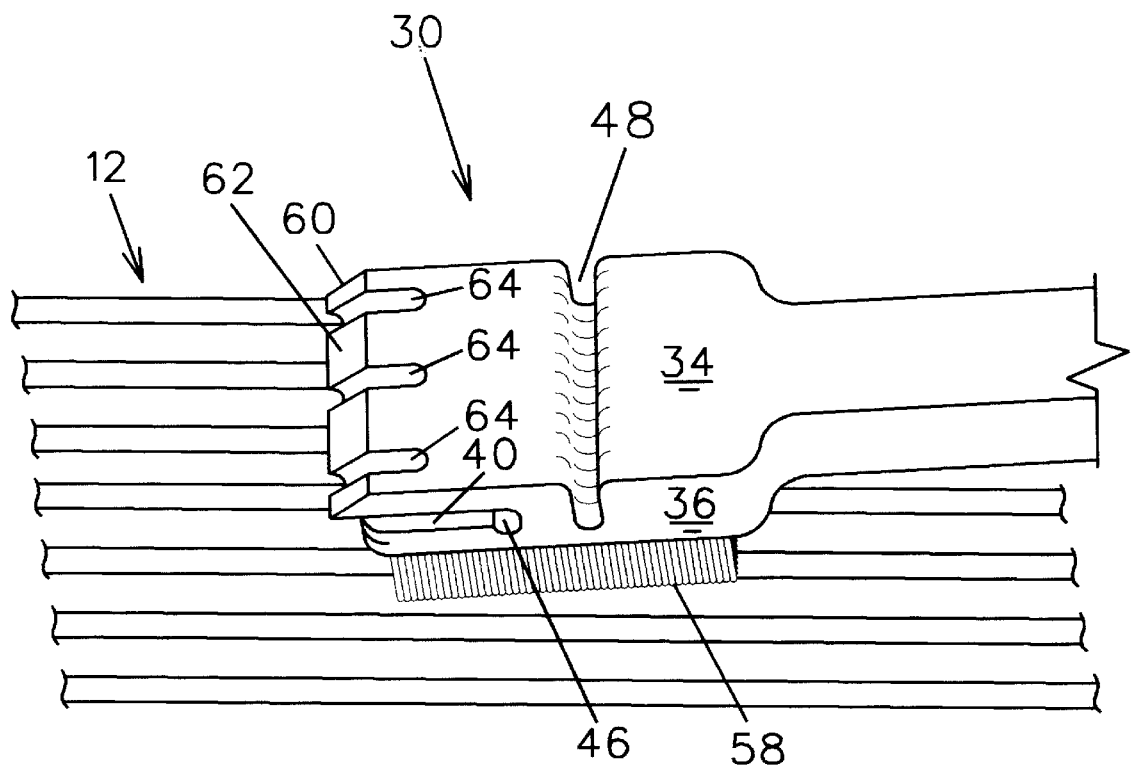
FIG. 3 is a perspective view of the bottom side of the head of the lifting tool showing use of the brush.
Figure 4:
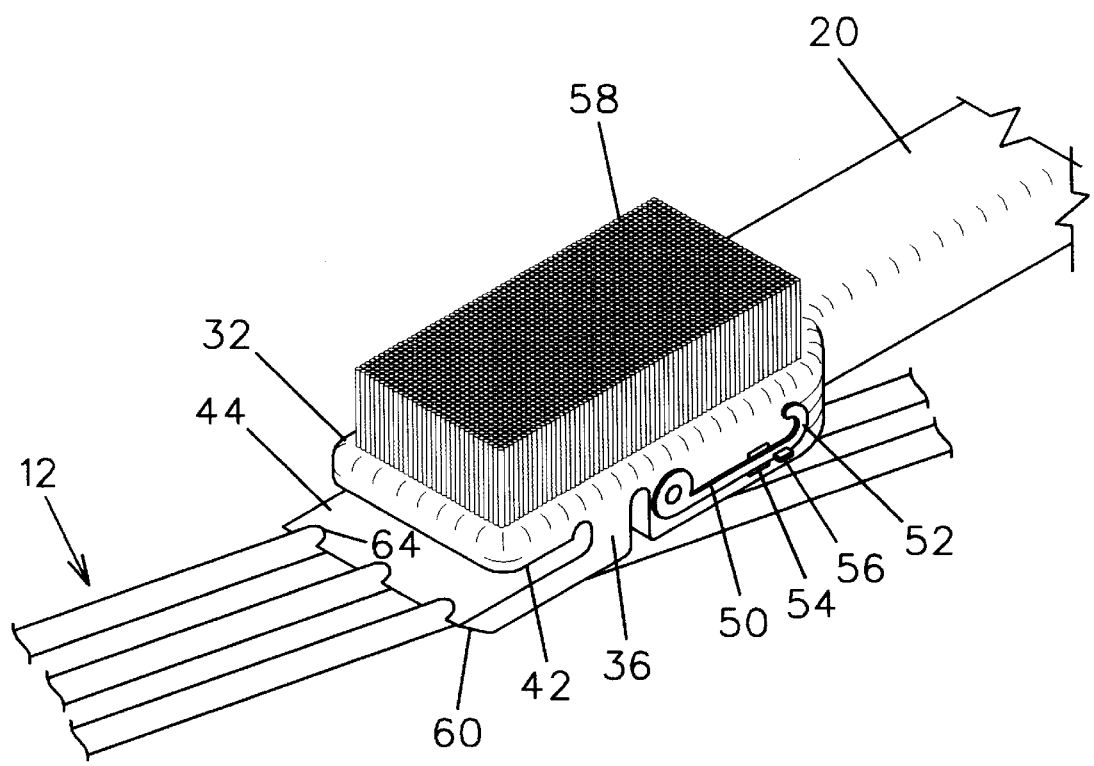
FIG. 4 is a perspective view of the head of the lifting tool showing use of the scraper.
Figure 5:
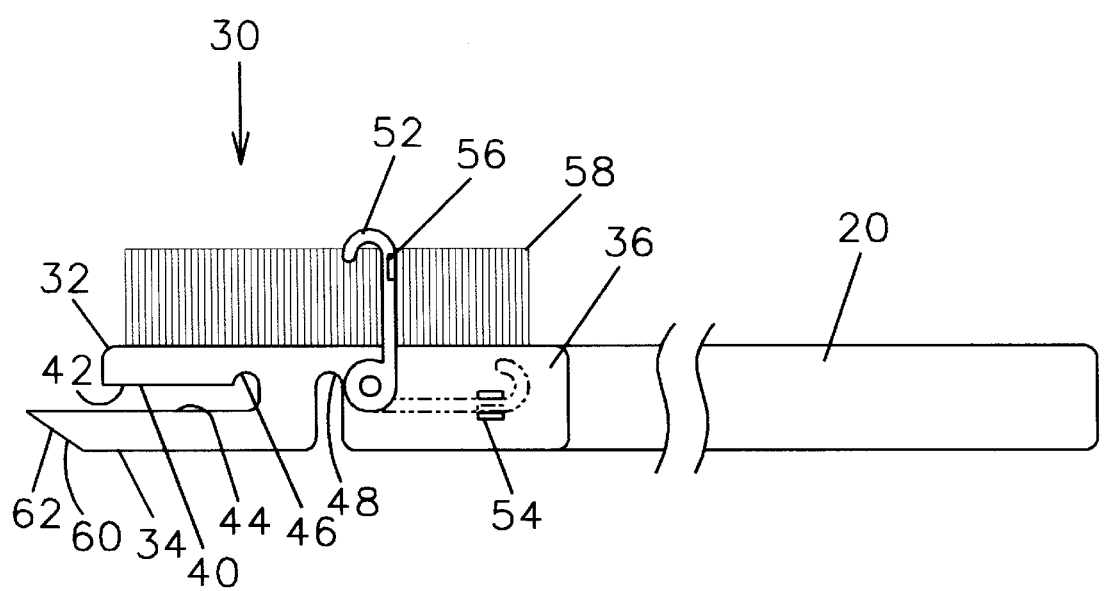
FIG. 5 is a side view of the lifting tool of FIG. 1 showing the position of the hook midway between its phantom line storage position and its clamping position.
Figure 6:
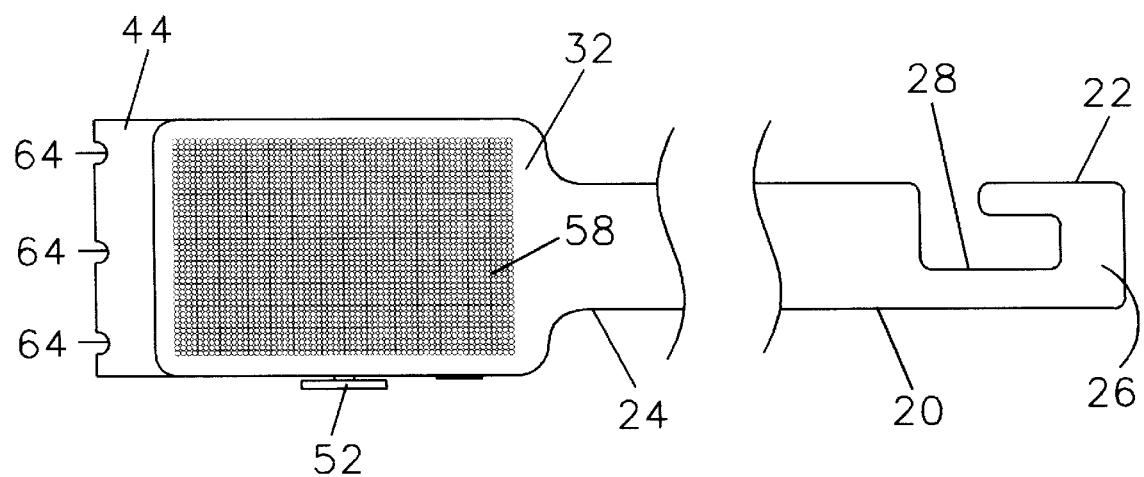
FIG. 6 is a top view of the lifting tool of FIG. 1.

The head 30 further includes a brush 58 fixedly attached to the upper surface 32 thereof (FIG. 4). Preferably, the brush includes wire bristles suitable for cleaning dried or burnt food and charcoal from bars of a grate 12 (FIG. 3). As shown in FIGS. 1 and 3, the lower surface 44 of the first slot 40 is longer than the lower surface 34 of the head 30, the head 30 having a slanted surface 62 extending therebetween to form a blade 60. The slanted surface 62 of the blade 60 presents a plurality of spaced apart annular notches 64 for scraping the bars of a grate 12, as in FIG. 4.

In use, the grill lifting tool 10 is manipulated at a downward angle to guide the upper 42 and lower 44 surfaces of the first slot 40 about two adjacent bars 14, 16 of a grate 12. The hook 50 is then pivoted to capture the bar 16 within the first slot 40 that is aligned with the second slot 46 and may seat therein. If the tool 10 is positioned within the horizontal plane of the grate 12, a third bar 18 may be received by the third slot 48. As the proximal end 22 of the handle 20 is lifted upward, the unsecured end of the grate 12 will tip causing the bars 14, 16, 18 within the slots 40, 46, 48 to be captured in a secure leveraged configuration. Also, the longer relative length of surface 44 offers underlying support to bar 13 exterior of slot 40 to enhance grill capture and transport. When the grate 12 is moved to its desired location, the hook 50 is pivoted to the FIG. 4 storage configuration and the tool 10 is slidably removed from about the bars.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A lifting tool for a grate having a plurality of spaced apart bars therein, said tool comprising:

a handle having a proximal end and a distal end relative to a user;

a head at said distal end of said handle, said head presenting an upper surface and a lower surface;

a first slot in said head adapted to receive at least two bars of the grate therein, said first slot presenting upper and lower surfaces positioned on opposed sides of the at least two grate bars in said first slot; and a second slot in said head and in communication with said first slot, said second slot generally extending from said upper surface of said first slot for capturing one of the grate bars therein upon a user lifting at said handle proximal end, whereby to raise said head and grate captured therein.

2. A lifting tool as claimed in claim 1 further comprising a third slot extending from said lower head surface and displaced from said first and second slots, said third slot adapted to be positioned on opposed sides of a third grate bar for capturing the third bar of the grate upon a user lifting at said handle proximal end, whereby to enhance said grate capture.

3. A lifting tool as claimed in claim 1 wherein said lower surface of said first slot extends beyond said upper surface of said first slot, whereby said lower surface of said slot is adapted to support a bar of the grate outside said first slot.

4. A lifting tool as claimed in claim 1 further comprising a surface extending between said lower surface of said first slot and said lower surface of said head, said surface adapted for scraping the grate bars.

5. A lifting tool as claimed in claim 4 further comprising a plurality of notches in said scraping surface for receiving grate bars therein.

6. A lifting tool as claimed in claim 1 further comprising a hook pivotally attached to said head between a first position free of a grate bar in said first slot and a second position for engagement with at least one of the grate bars in said first slot.

7. A lifting tool as claimed in claim 1 further comprising a brush portion attached to said head adapted to clean the grate bars.

8. A lifting tool for a grate having a plurality of spaced apart bars therein, said tool comprising:

a handle having a proximal end and a distal end relative to a user;

a head at said distal end of said handle presenting an upper surface and a lower surface;

a first slot in said head adapted to receive at least two bars of the grate therein, said first slot presenting upper and lower surfaces positioned on opposed sides of the at least two grate bars in said first slot; and means for coupling one of the grate bars in said first slot to said head for lifting of the grate by a user.

9. A lifting tool as claimed in claim 8 wherein said coupling means comprises a fastener pivotally attached to said head between a first position free of a grate bar in said first slot and a second position for engagement with at least one of the grate bars within said first slot.

10. A lifting tool as claimed in claim 8 further comprising a second slot in said head and in communication with said first slot, said second slot generally extending from one of said surfaces of said first slot for capturing one of the grate bars therein upon a user lifting at said handle proximal end, whereby to raise said head and grate captured therein.

11. A lifting tool as claimed in claim 10 further comprising a third slot displaced from said first and second slots, said third slot adapted for capturing a bar of the grate upon a user lifting at said handle proximal end, whereby to raise said head and grate captured therein.

12. A lifting tool as claimed in claim 8 wherein said lower surface of said first slot extends beyond said upper surface of said first slot, whereby said lower surface of said slot is adapted to support a bar of the grate outside said first slot.

13. A lifting tool as claimed in claim 8 further comprising a surface extending between said lower surface of said first slot and said lower surface of said head, said surface adapted for scraping the grate bars.

14. A lifting tool as claimed in claim 13 further comprising a plurality of notches in said scraping surface for scraping grate bars received therein.

15. A lifting tool for a grate having a plurality of spaced apart bars therein, said tool comprising:

a handle having a proximal end and a distal end relative to a user;

a head at said distal end of said handle;

a first slot in said head adapted to receive at least two bars of the grate therein; and a second slot in said head and in communication with said first slot, said second slot adapted for capturing one of the grate bars in said first slot upon a user lifting at said handle proximal end, whereby to raise said head and grate captured therein.

16. A lifting tool as in claim 15 further comprising means for coupling one of the grate bars in said first slot to the head for lifting of the grate by a user.

17. A lifting tool as claimed in claim 16 wherein said coupling means comprises a hook on said head releasably engageable with at least one of the grate bars in said first slot.

18. A lifting tool as claimed in claim 17 wherein said hook includes a first end pivotally attached to said head and a second free end configured to surround one of the bars of the grate in said first slot.

19. A lifting tool as claimed in claim 15 further comprising a third slot displaced from said first and second slots, whereby to lift said head and grate captured therein.

20. A lifting tool as claimed in claim 15 wherein said head presents a free end at said distal end of said tool, said free end of said head including a plurality of notches therein adapted for receiving grate bars therein, said head free end presenting a scraping surface for the grate bars in said notches.

* * * * *